United States Patent [19]
Lister

[11] Patent Number: 4,618,949
[45] Date of Patent: Oct. 21, 1986

[54] SELF-ORIENTING DIRECTIONALLY SENSITIVE GEOPHONE

[76] Inventor: Clive R. B. Lister, P.O. Box 45101 University Station, Seattle, Wash. 98145

[21] Appl. No.: 590,734

[22] Filed: Mar. 19, 1984

[51] Int. Cl.$^4$ .......................... H04R 1/44; G01V 1/16
[52] U.S. Cl. .................................... 367/171; 367/185; 310/15; 73/652
[58] Field of Search ........ 367/171, 156, 912, 182–185, 367/20, 140, 186, 187; 73/649, 652, 654, 516 R, 516 LM; 29/602 A; 179/115.5 VC; 310/15, 25

[56] References Cited

U.S. PATENT DOCUMENTS

| | | | |
|---|---|---|---|
| 2,902,667 | 9/1959 | Schriever | 367/184 |
| 3,054,085 | 9/1962 | Alexander | 367/185 |
| 3,283,293 | 11/1966 | Pavey, Jr. et al. | 367/172 |

OTHER PUBLICATIONS

Magnetic Fluids Engineering Kit, Ferrofluidics Corporation.
Rosensweig, "Magnetic Fluids", Ferrofluidics Corp. Tech. paper.

*Primary Examiner*—Thomas H. Tarcza
*Assistant Examiner*—Daniel T. Pihulic
*Attorney, Agent, or Firm*—Garrison & Stratton

[57] ABSTRACT

A self-orienting, directionally sensitive particle velocity transducer with an axially magnetized magnet which, displaced by gravity, floats off-center in a chamber filled with ferromagnetic fluid. Wire coils affixed coaxially to the chamber ends asymmetrically intersect the magnet's flux lines. Axial chamber rotation results in gravitationally induced sideways movement of the magnet to maintain its equilibrium position. An impinging sound wave causes relative movement between the low inertia chamber-coil assembly and the high inertia magnet, thereby inducing a voltage in the coils—a relatively high voltage for vertical movement due to vertical assymetry, but a relatively low voltage for horizontal movement due to horizontal symmetry. Axial sensitivity is low because the ferromagnetic fluid filling the narrow gap between the magnet and the chamber ends resists relative axial movement and any induced voltages in the coils cancel. Substitution of an eccentrically weighted, axially polarized, composite magnet divided into oppositely polarized halves allows a smaller chamber and makes assymetry/symmetry independent of gravitationally induced displacement, thus allowing configuration for any direction of sensitivity.

14 Claims, 5 Drawing Figures

SELF-ORIENTING DIRECTIONALLY SENSITIVE GEOPHONE

TECHNICAL FIELD

This invention relates to electroacoustic detecting devices and more particularly to particle velocity detectors or transducers commonly known as geophones. Utilizing ferromagnetic fluid as a suspension means for a magnet, the present invention may be used for sensing seismic signals in survey systems which profile the location and probable nature of underlying geological substrata.

BACKGROUND ART

Seismic surveying or prospecting is one common method used by geologists and others engaged in mineral exploration activities to help determine the most probable location of mineral deposits which are of sufficient size to justify the economic costs of extraction or mining. Experience has taught that certain geological substrata formations are more likely than others to be associated with the presence of exploitable mineral deposits. It is by providing a survey or profile of geological substrata formations, both on land and in water covered areas, that seismic prospecting demonstrates its utility.

To create a seismic profile, a seismic shock is initiated at a selected point. This shock is reflected from the various underlying substrata (often called reflectors) and these reflections are detected at a plurality of locations by sensitive transducers which translate the received signal into electrical impulses which can be recorded on a chart. By utilizing the known distance and direction of the various transducers from the source of the seismic shock and by correlating the elapsed time between the initiation of the shock and the detection of the various reflections by each transducer, a profile of the underlying strata can be constructed.

Due to the high sensitivity of the transducers, seismic prospecting is often hampered by background interference. On land, this interference is sometimes called "wind noise" or "ground unrest". Problems with interference take on added dimensions when seismic work is done in water covered areas. Water is an efficient propagator of sound in all directions. Also, the interface between water and the air reflects pressure waves and causes them to undergo a 180 degree phase shift.

In modern marine seismic systems the usual practice comprises a seismic shock generator; a relatively small diameter neutrally buoyant oil-filled flexible tube or streamer which contains a plurality of spaced apart pressure transducers, and a vessel or boat which tows the generator and streamer through the water and which has on board the equipment which processes the signals received from the transducers and generates the seismic profile or chart. Despite an inherent sensitivity to seismic signals in the water regardless of the direction of signal travel (e.g., the wake of the towing vessel and the disturbance created by its propeller as well as phase-shifted and reflected signals from the air-water interface) the pressure sensitive type transducer, or hydrophone, continues in widespread use primarily because its small size allows it to fit in a tube of acceptable diameter and its relative simplicity of design results in low cost to the user. This is important because a typical streamer can be in excess of 5,000 feet in length and can contain thousands of transducer elements divided between 96 or more receiving channels, often with up to 50 elements connected to each channel.

Various means and methods have been proposed as improvements to the art of marine seismology. Early on, it was discovered that interference from surface reflections caused by the mismatch of acoustical impedance at the air-water interface could be substantially controlled by towing the streamer at a depth which corresponded to one-quarter wavelength of the seismic signal. Use of this towing depth prevents a 180 degree phase shifted surface reflection from arriving at the transducer at the same time as the desired signal, but in the opposite direction, which would thereby cause nearly total cancellation of the desired signal. The surface reflected signal does modify the appearance of the seismic profile. However, as long as the frequencies used are close to the one frequency for which the streamer depth is exactly a quarter wavelength, the broadening of the traces is small.

Difficulties arise when very high resolution of reflectors is desired, corresponding to a very wide bandwidth of received frequencies. Under these circumstances, it is not possible for the streamer to be at the correct depth to receive all these frequencies. For instance, if it is to be quiet and receive the low frequencies it must be at a considerable depth. At the higher frequencies needed for good resolution, the depth passes through multiples of a half wavelength, where there is almost perfect cancellation and consequent loss of data. Towing a hydrophone streamer near the surface in an attempt to receive a broad band of the higher frequencies exposes the streamer to the action of surface waves and causes high tow noise to be generated.

In attempting to deal with sensitivity to interference signals which travel horizontally, it has been suggested that a dual spread of vertically spaced apart hydrophone equipped streamers be utilized. The vertical separation distance between the two streamers is set such that a vertically arriving seismic wave will produce outputs from each streamer which are one-half period out of phase with each other. If the signals output from one streamer are then subtracted from corresponding signals output from the other streamer, any horizontally traveling energy signals are cancelled. This is because such horizontal signals reach both streamers at the same time and are in phase with each other. The difficulties of keeping a single streamer several kilometers long at a uniform depth apply with equal force to this method where two streamers are to be maintained at a fixed vertical distance from each other. Deployment and retrieval of such a system in anything but flat-calm waters would also be difficult.

The two foregoing methods utilize pressure sensitive transducers known as hydrophones. As earlier noted, hydrophones can be regarded as being equally sensitive in all directions. There is a second type of seismic transducer which depends upon displacement or inertia and therefore is responsive to particle velocity rather than pressure. Such particle velocity transducers are commonly known as geophones. A geophone typically utilizes a magnet in conjunction with a coil which is suspended in the air gap of the magnet in such a way that the turns of the coil will move at the particle velocity of the surrounding medium and cut the lines of magnetic flux, thereby generating an induced electromotive force.

Geophones have been developed which display an enchanced sensitivity along a single axis; typically, the vertical axis. This selectivity has been achieved by use of mechanical bearing gimbal mountings together with slip rings and wiper contacts as electrical connections. It has also been achieved by suspending a circular coil with three equally spaced springs so that, under the influence of gravity, the coil achieves an asymmetric relationship to a circular magnetic field. If an assembly containing this latter arrangement is rotated about the axis of the circular magnetic field, the three equally spaced suspension springs allow gravity to cause the coil to maintain its previously existing asymmetrical location with respect to the field. The asymmetric relationship between the coil and field provides vertical sensitivity because a vertical movement of the coil will cut many flux lines per second whereas a horizontal movement of the coil will cause few, if any, lines of flux to be cut per second.

Though both of the above geophones display a marked lack of sensitivity to sideways approaching signals, a feature of much value in marine seismic work, they are of complicated design with numerous machined parts and delicate assemblies which require close tolerances in manufacture and, therefore, are not inexpensive enough or rugged enough or, in some cases, small enough for viable use in a marine environment. Also, due to an equal sensitivity to movement in both directions along the vertical axis, these geophones remain subject to the problems associated with signals reflected from the air-water interface.

All of the foregoing discussion contemplates streamers containing only one type of transducer, i.e., either all hydrophones or all vertically oriented geophones. At least one proposal has been made (and this in conjunction with the otherwise unsatisfactory gimbal mounted geophone discussed above) to utilize geophone-hydrophone pairs spaced along the entire length of a single streamer. The purpose of such an arrangement is to utilize the cardioid principle to produce a uni-directional response. The operation of the cardioid principle is grounded on the fact that a sound wave is a longitudinal wave and can be described either in terms of variations in pressure about an equilibrium point, or, in terms of the actual displacement about an equilibrium point of the particles conveying the wave. The difference between the two descriptions of the waves that is here important is that the displacement wave is 90 degrees out of phase with the pressure wave. Hence, by summing signals at equal sensitivity from a particle velocity transducer and a pressure transducer, a uni-directional response can be obtained. A sound wave approaching the transducer pair from one direction causes both transducers to produce outputs with the same polarity and thus the two outputs add. A sound wave from the 180 degree opposite direction causes the transducers to produce outputs of opposite polarity which, therefore, cancel each other.

This uni-directional or cardioid response would be very useful for deep seismic profiling in the ocean because the surface reflections could be eliminated, making it possible to tow the streamer at any convenient depth. The present requirement for precise depth control to tune the receiver to the expected frequency of the reflections would disappear, as a cardioid receiver is inherently broadband, a characteristic which also allows the cardioid receiver to easily handle the very wide bandwidth of received frequencies associated with high resolution work. Such high resolution work in the open ocean would not be subject to the unsatisfactory compromise between shallow towing for high resolution, and deep towing for quietness in the presence of ocean waves and vessel noise.

To achieve the cardioid response, the geophone of the geophone-hydrophone pair must be self-orienting. The long oil-filled streamer is quite flexible and can twist or rotate along its longitudinal axis as it moves through the water. It is therefore necessary that each geophone have the means to seek and maintain an orientation to true vertical independently of the orientation of the streamer in which it is mounted. The means applied to achieve self-orientation should be resistant to shock, introduce no electrical noise during towing movements, and result in an element of small diameter, simple design, moderate cost of manufacture, and no maintenance or adjustment after it is installed in the streamer.

DISCLOSURE OF THE INVENTION

The geophones of this invention are adapted to provide vertical directional sensitivity together with an ability to individually seek and then retain a vertical orientation independent of the orientation of the tube or streamer within which they are being towed. Further, due to its novel design, one embodiment of this invention may, at the time of manufacture, be configured to provide sensitivity to particle movement along any desired axis ranging from true vertical to true horizontal while, at the same time, remaining relatively insensitive to any movement not aligned with the axis of sensitivity.

Each of the directionally sensitive geophones of this invention are characterized by a structure which utilizes gravitational force to cause a magnetic field and an associated coil to become physically and/or magnetically asymmetrical in relation to a given direction of sensitivity and yet remain substantially symmetrical for all other directions of movement. This is accomplished in the present invention by using ferromagnetic fluid to suspend a magnet within a chamber. As will be seen, use of a ferromagnetic fluid suspension provides both the properties of a spring suspension and those of frictionless gimbals.

The magnet remains suspended in the chamber because the pressure distribution of the surrounding ferromagnetic fluid is strongly affected by the application of a magnetic field. An augmented pressure force arises within the fluid which is directed toward decreasing values of field magnitude, i.e., the stronger the field, the greater the pressure. In the present invention, since the magnet is surrounded on all sides by the ferromagnetic fluid, it tends (absent the force of gravity) toward equilibrium at the center of the chamber. Any force which operates to bring the magnet and any interior surface of the chamber into closer proximity with each other will, as a consequence of such movement, also cause a concentration of flux lines within the reduced volume of ferromagnetic fluid then remaining immediately between the chamber surface and the magnet. This localized compression of the magnetic field is accompanied by a localized increase in pressure which provides the force necessary to restore equilibrium.

The chamber which contains the magnet and the ferromagnetic fluid is adapted to provide at least one pickup coil which is oriented in a plane substantially perpendicular to the magnet's lines of flux. Since the magnet has relatively high inertia as compared to the inertia of the chamber and coil assembly, and since the ferromagnetic fluid advantageously presents a relatively low mechanical impedance to relative movement between the two components, the chamber and coil assembly, being in contact with the surrounding medium, is free to respond to the velocity of the particles of that surrounding medium as they oscillate about their equilibrium position. These oscillatory movements cause the coil to cut the magnet's lines of flux thereby inducing in the coil an electromotive force (or flux change) proportional to the velocity of the coil relative to the magnet.

Being directionally sensitive, the geophones of this invention produce a much greater flux change in the coil for movement along the axis of sensitivity than for movement in other directions. This is due to the previously described asymmetrical relationship between the magnetic field and the coil.

In one embodiment of this invention, asymmetry is introduced by allowing a magnet to be displaced downwardly by the force of gravity until a new equilibrium point within the ferromagnetic fluid is reached. In other embodiments of this invention, the magnet is weighted eccentrically and gravity causes it to rotate about a horizontal axis in a manner analogous to the use of gimbals. In this latter case, the asymmetry is magnetic in nature and results from the use of a composite magnet wherein one half of the magnet is of opposite polarity from the other half, rather than an asymmetry in the magnet's physical postion relative to the coil.

It is thus seen that, as used in this invention, the ferromagnetic fluid has multifaceted utility. It facilitates the asymmetry necessary for directionality, it provides a gimbal-like action to permit self-orientation, and it acts as an omnidirectional spring with low mechanical impedance to permit response to seismic signals.

The ferromagnetic fluid has one drawback, however. After prolonged storage without movement (weeks or months) there is a tendency for the magnetic particles to segregate under the influence of the magnetic fluid gradient. This can cause the magnet to become locked in place, and unable to stir the fluid to restore the previous uniformity. The problem can be overcome by the use of specially stabilized fluids, combined with a shaker or vibrator through which the streamer is passed during deployment. Although not free to move under the influence of small vibrations, the magnet is not so firmly locked that vigorous shaking cannot move it. The stabilized fluid responds to the shaking by redispersing and restoring the normal floating action.

Accordingly, it is an object of this invention to provide a new and useful particle velocity sensing transducer or geophone which is directionally sensitive and self-orienting.

It is another object to provide a geophone of small size, simple design and low cost to the user making it economically feasible to incorporate great numbers of these geophones into the construction of marine seismic detection streamers.

It is a further object to provide a vertically sensitive self-orienting geophone which may be advantageously combined with pressure-sensitive hydrophones to obtain a unidirectional or cardioid response.

It is yet another object to provide a self-orienting geophone which may, at the time of manufacture, be configured to produce sensitivity in any desired direction, e.g., vertical, horizontal or 45 degrees to either side of vertical, thereby making possible the construction of marine seismic detection streamers which can provide the information necessary to laterally locate the source of the reflected signal with respect to the streamer.

It is still another object of this invention to provide a self-orienting geophone which does not require the use of mechanical bearing gimbals or slip ring and brush electrical contacts, and which does not require internal maintenance or adjustment after installation in a marine seismic survey streamer.

BEST MODE OF CARRYING OUT THE INVENTION

Figure 1:
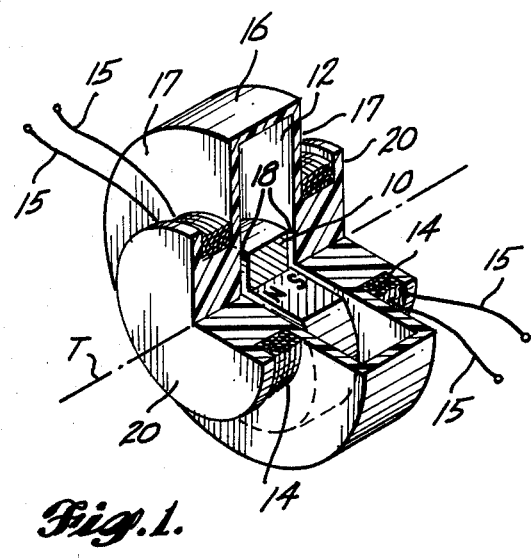
FIG. 1 is a perspective view which is partially broken away to show a cross section of the functional components of one embodiment of the invention.

The basic structure of this invention, as shown in FIG. 1, comprises a magnet floating inside a chamber filled with magnetic fluid together with external wire coils which interact with the flux of the magnet. The three embodiments shown in the drawings differ in construction primarily on the basis of the configuration of the magnetic structure (hence magnetic field) utilized.

As best seen in FIG. 1, the chamber 12 is a sealed compartment with relatively thin walls which may be in the form of a right circular cylinder 16 with parallel ends 17, 17 disposed in planes which are perpendicular to the axis of the chamber. Each end wall 17 supports a coil of wire 14 coaxial with said end wall.

Coils 14, 14 are conveniently mounted on flanged coil forms 20, 20 which are shown formed as an integral part of and coaxial with end walls 17, 17. However, it is understood that coil form 20 could be formed as a separate part and subsequently attached to the end wall 17, or a pre-formed coil could be directly attached to end wall 17 with adhesive, thereby dispensing with coil form 20 altogether. Leads 15, 15 extend from each coil 14 to permit electrical connection to the signal wires (not shown) which extend throughout the length of the detection streamer.

When installed within the oil-filled tubular detection streamer, the invention is positioned with its walls 17, 17 perpendicular to and coaxial with the towing axis of the streamer designated by the arrow, T, shown in FIG. 1. In this position, chamber 12 and coils 14, 14 are fully immersed within the oil which fills the detection streamer and are free to move in response to the particle velocity of the displacement waves present in the surrounding medium. Communication with the surrounding medium is thus accomplished without the need for perforated structures, diaphragms, machined and threaded fittings, o-rings or other complicated structural components.

Within the chamber 12 is a magnet 10 which may be a solid magnet of the short cylindrical shape shown in FIG. 1. Magnet 10 is magnetized axially along tow axis T as shown by the North (N) and South (S) pole designations adjacent to the magnet's pole surfaces which lie parallel to ends 17, 17. This causes the lines of flux associated with magnet 10 to intercept the plane of each coil 14 on a substantially perpendicular basis.

Magnet 10 is suspended at an equilibrium point within chamber 12 by the pressure distribution of the surrounding ferromagnetic fluid. The narrower the space between the surface of magnet 10 and any given inner surface of chamber 12, the greater the augmented pressure which will exist between the two surfaces. Thus, the narrow gaps 18, 18 which exist between the pole faces of magnet 10 and the inner surfaces of chamber end walls 17, 17 are associated with strong augmented pressure forces which keep the magnet firmly centered between the two end walls 17, 17 and which provide a strong resistance to relative movement between the magnet 10 and chamber 12 in response to axial vibrations along tow axis T or to twisting motions and undulations of the detection streamer as it is towed through the water. This same augmented pressure force also serves to suspend magnet 10 in the vertical direction as best shown in FIG. 3.

Figure 2:
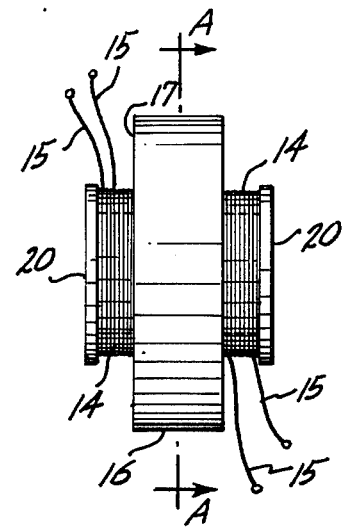
FIG. 2 is a longitudinal elevational view of the chamber and coil assembly which is common to each illustrated embodiment of the invention.
Figure 3:
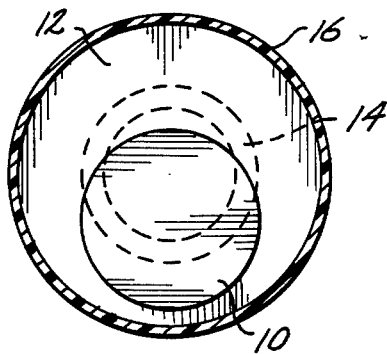
FIG. 3 is a diagrammatic transverse cross section of the embodiment shown in FIG. 1 taken along cutting line A—A of FIG. 2.

In FIG. 3 is shown a diagrammatic cross section of the embodiment shown in FIG. 1 taken along cutting line A—A of FIG. 2. This FIG. 3 looks along tow axis T and shows the equilibrium position of the magnet 10 with respect to the chamber periphery 16 and coil 14. All other details are eliminated to provide clarity. As shown, the magnet 10 is floating off-center within the chamber 12. This is due to the large diameter of the chamber 12 relative to that of the magnet 10 so that the pressure augmentation necessary to balance the downward displacement caused by gravity occurs only when magnet 10 has moved quite close to the chamber periphery 16. Coil 14, being attached to the chamber end wall 17, remains coaxial relative to chamber periphery 16. The magnet 10 and the coils 14, 14 thus become asymmetrically related due to the force of gravity.

Due to this vertically asymmetric relationship, the quantity of magnetic flux from magnet 10 (magnetized perpendicular to the plane of FIG. 3) that passes through coils 14, 14 varies substantially when the chamber and its attached coils move vertically in response to displacement waves in the surrounding medium. This induces an electromotive force in coils 14, 14 proportional to the velocity of coils 14, 14 relative to magnet 10; a voltage output that can be amplified and recorded by the usual methods. However, if the relative movement between coils 14, 14 and magnet 10 is horizontal, the flux change in the coils is relatively slight due to the horizontally symetrical relationship between magnet 10 and coils 14, 14.

Thus, the structure of FIGS. 1 and 3 has the response of a vertically oriented geophone, due only to the effect of the force of gravity which causes the magnet and coils to be asymmetrically related for vertical particle movement and still remain symmetrically related for horizontal particle movement. Also, should the structure be rotated about towing axis T, the ferromagnetic fluid allows gravity to cause the magnet 10 to immediately seek and then retain the preexisting vertically asymmetric relationship between it and the coils 14, 14. This self-orienting aspect of the invention permits a plurality of the devices to be installed within a detection streamer without concern for the changes in orientation undergone by the streamer as it is towed through the water. Each geophone constructed in accordance with this invention will separately and independently maintain its own directional orientation. Since the only moving part of the structure is the magnet which moves through the ferromagnetic fluid, the coils 14, 14 can be in permanent fixed electrical connection with the signal wires in the streamer. The need for mechanical gimbals, slip rings and electrical contact brushes is advantageously eliminated.

Figure 4:
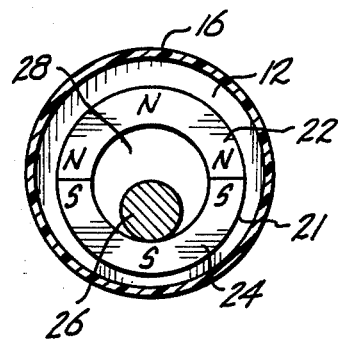
FIG. 4 is a diagrammatic transverse cross section taken along cutting line A—A of FIG. 2 of an alternative embodiment of the invention (with coils omitted for clarity) which is configured to provide vertical sensitivity.

An alternative embodiment is shown in diagrammatic cross section in FIG. 4 with the coils 14, 14 and coil forms 20, 20 omitted for clarity of illustration. The most significant difference between this embodiment and the embodiment previously described is found in the type of magnetic structure utilized. As seen in FIG. 4, the magnetic structure of this embodiment is preferably formed as a relatively thick-walled, hollow, right circular cylinder which is magnetically divided along its diameter into two axially magnetized segments or halves, with each half being of opposite polarity to the other.

The axial magnetization of the segments is along tow axis T and the opposite polarities of the segments are shown in FIG. 4 with the North (N) pole designation on the facing pole surface of magnet segment 22, and the South (S) pole designation on the facing pole surface of magnet segment 24. The two segments together form composite magnet 21. If composite magnet 21 were to be viewed from the opposite direction along tow axis T, the observed polarities of segment 22 and segment 24 would be the opposite of those shown in FIG. 4. It is understood that the polarities shown have been arbitrarily assigned to each segment and that the prerequisite for proper functioning of the invention is that the two segments be of opposite axial polarity.

Chamber 12 is filled with ferromagnetic fluid and composite magnet 21 floats within chamber 12 for the same reasons as previously described for the first embodiment. However, in this second embodiment, composite magnet 21 has an outer diameter which is only slightly smaller than the inside diameter of chamber 12. This causes composite magnet 21 to assume a position which is substantially concentric (i.e., displaced downwardly only slightly) in the vertical direction with regard to the chamber 12, even when subjected to the full force of gravity as is the case when the device is mounted in a detection streamer which is being towed. The coils 14, 14 of this second embodiment are coaxial with chamber 12 and are of substantially the same inner and outer diameter as composite magnet 21.

The hollow center 28 of composite magnet 21 has a biasing means mounted within it. In the preferred form of this second embodiment, the biasing means is a non-magnetic weight 26. Weight 26 may be made of lead or other heavy non-magnetic substance, or it could be a hollow structure filled with gas or other light substance. In the case of use of a gas, etc., gravity would cause composite magnet 21 to rotate 180 degrees from the position depicted in FIG. 4. Any convenient means may be utilized to secure weight 26 into position within hollow center 28. In the embodiment shown, weight 26 is held in position by filling hollow center 28 with a polymerized epoxy resin.

The position of weight 26 within hollow center 28 determines the axis of sensitivity of the geophone represented by this second embodiment of the invention. In FIG. 4, weight 26 is shown positioned along the periphery of hollow center 28 and is centered over a point which is equidistant from (or rotated 90 degrees from) the two boundaries on either side of composite magnet 21 where magnet section 22 meets magnet section 24. When so positioned, gravity acts upon weight 26 to cause composite magnet 21 to rotate until it reaches equilibrium. At equilibrium, a true vertical line drawn from top to bottom through the center of composite magnet 21 will bisect magnet segments 22 and 24 and will pass through the center of gravity of weight 26.

Thus, when weight 26 is positioned to produce vertical sensitivity, the unweighted magnet segment 22 becomes the "top half" and the weighted magnet segment 24 becomes the "bottom half". And, the boundaries between the two halves coincide with true horizontal. It is thus seen that the axis of sensitivity of this embodiment is perpendicular to a straight line which lies parallel to the two boundaries between magnet section 22 and magnet section 24. As in the first embodiment, should chamber 12 and its associated coils 14, 14 be rotated about towing axis T, gravity alone will act upon weight 26 to cause composite magnet 21 to rotate so that sensitivity to true vertical is maintained.

In this second embodiment, relative movement between the composite magnet 21 and coils 14, 14 in the vertical direction produces a large net change of flux in coils 14, 14 because of the opposite polarity of magnet segments 22 and 24, i.e., the magnetic field produced by composite magnet 21 is asymmetric with respect to coils 14, 14 for vertical movement. However, a relative horizontal movement causes virtually no net change in flux in coils 14, 14, the cancellation being superior to that produced by the first embodiment shown in FIG. 1 and FIG. 3 due to the horizontal double symmetry of the structure of this second embodiment.

Figure 5:
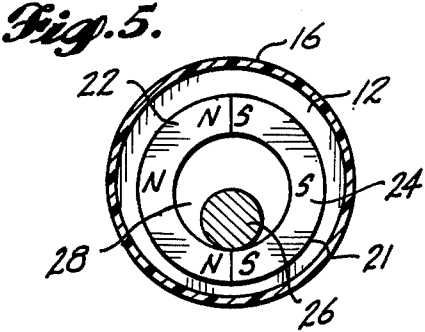
FIG. 5 is a diagrammatic transverse cross section taken along cutting line A—A of FIG. 2 of still another alternative embodiment of the invention (also with the coils omitted for clarity) which, in this instance, is configured to provide horizontal sensitivity.

A third alternative embodiment of this invention is shown in diagrammatic cross section in FIG. 5. Once again, coils 14, 14 and coil forms 20, 20 are omitted for clarity of illustration. The only difference between the embodiment shown in FIG. 5 from the one shown in FIG. 4 is the location of the biasing means, weight 26. Though it still remains located on the periphery of hollow center 28, weight 26 is now centered over one of the boundaries between magnet segment 22 and magnet segment 24. This location is 90 degrees away from that utilized in the second embodiment.

With weight 26 in this new location, composite magnet 21 now reaches equilibrium in an orientation which is rotated 90 degrees from that shown for the second embodiment. The boundaries between magnet segment 22 and magnet segment 24 now are parallel to true vertical rather than true horizontal. Since the axis of sensitivity is perpendicular to a straight line drawn through the two boundaries, the embodiment shown in FIG. 5 is primarily sensitive to horizontal motion, and has little sensitivity to vertical motion.

It is thus seen from FIGS. 4 and 5 that the design of the geophone of this invention may be modified to display enhanced sensitivity along any desired axis by merely changing the location of weight 26 along the periphery of hollow center 28. For instance, placement of weight 26 at a point one-half way between the two locations previously shown results in a self-orienting geophone with a sensitivity for motion along a path which is 45 degrees to one side of vertical. By reversing the geophone end for end within the detection streamer, this same production element will display a sensitivity for motion along a path which is 45 degrees to the other side of vertical.

Even if it were not possible to construct a device with 45 degree sensitivity, the availability of a horizontally sensitive self-orienting geophone, as shown in FIG. 5, broadens considerably the number of acoustic responses possible from an array of a plurality of the devices. For example, an array containing equal numbers of vertically and horizontally sensitive geophone elements constructed in accordance with this invention can have its axis of sensitivity steered anywhere in the plane perpendicular to tow axis T by electronically summing various proportions of the two signals corresponding to horizontal and vertical motions. Sensitivity of the array to sound travelling along the tow axis T is low, not only because of the plurality of the elements, but also because the augmented pressure within the ferromagnetic fluid associated with axial gaps 18, 18 makes each individual element insensitive to such longitudinal vibrations. However, since it utilizes only geophones, this array is equally sensitive to motion in both directions along the axis of sensitivity of the two types of elements with a resultant ambiguity as to the absolute direction of any sound waves received.

This directional ambiguity can be resolved by including a plurality of pressure transducers or hydrophones in the horizontal and vertical geophone array described above. Three different signals would then be available for electronic processing, either to generate a cardioid response in any chosen direction in the plane perpendicular to tow axis T, or to analyze the absolute direction of arrival of any packet of sound waves. Some loss of the rejection of noise along tow axis T must occur due to the inclusion of the non-directional hydrophones, but the pressure signal could be used to establish the direction of propagation of a sound packet by using the strongest waves in that packet, while the quieter displacement wave signal from the self-orienting geophones could be used to analyze the geologic substrata which reflected the signal.

By providing a practical, self-orienting particle velocity transducer which may be configured to produce sensitivity along any desired axis within a vertical plane, the geophone of this invention makes possible the construction of improved marine seismic detection streamer arrays which are capable of producing a unidirectional cardioid response together with the further capability of directing that cardiod response to either side of the streamer to provide information about the lateral position of the sources of reflected sound with respect to the tow axis of the streamer.

These same advantages exist if the discrete horizontally and vertically sensitive geophone elements are replaced with geophones which incorporate 45 degree sensitivity. In this latter case, only one production version of the invention is required since the elements need only be turned end for end to change the directional sensitivity from one side of vertical to the other. Seismic surveys made with either version of the above described streamers could thus be completed with a greatly reduced number of tracklines and hence reduced costs.

INDUSTRIAL APPLICABILITY

The geophones of this invention may be manufactured by using existing machinery, processes and techniques. The ferromagnetic fluid, epoxy resin, coil wire and each type of magnet (preferably Samarium-cobalt) are all existing products which are readily available in the marketplace. The shape of the lead weight which biases the composite magnet is not critical, except that it should lend itself to ease of assembly, and thus could be crescent shaped in cross section with an indentation to mark its center point instead of the round weight shown in the drawings. Finally, the chamber and coil forms may be readily formed from a suitable plastic by the injection molding process.

Major areas of use include seismic surveying and particularly those systems used to evaluate underwater geological formations. In a typical application, a plurality of these geophones are installed in a longitudinally spaced apart manner within an oil filled flexible tube or streamer which can be in excess of 5,000 feet in length. Such an assembly is known as a detection array. The streamer also contains an electrical cable. Subgroups of the geophones are connected to various wires within the cable with each subgroup serving as a single receiving channel. Being self-orienting, the geophones of this invention may be paired with pressure sensitive hydrophones to provide a uni-directional or cardiod response.

When not deployed for use, the streamer may be conveniently stored on a large reel carried on board the survey vessel. Upon deployment, the array is towed along a track line; a seismic shock is initiated and the reflections of that shock emanating from the underlying geological substrata are sensed by the geophones within the array. The various outputs from each channel are electronically processed on board the towing vessel and then utilized as inputs to a seismic recorder which generates a seismic profile or chart.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the legitimate and valid scope of the appended claims appropriately interpreted in accordance with the doctrine of equivalents.

What I claim is:

1. A geophone comprising, in combination:
   magnetic field means with a polar axis aligned horizontally;
   sealed chamber means containing a ferromagnetic fluid and magnetic field means, the ferromagnetic fluid interacting with the magnetic fluid means to movably suspend said magnetic field means within the ferromagnetic fluid;
   coil means associated with said sealed chamber means, the axis of the coil means aligned with the axis of the magnetic field means whereby relative vertical movements of the sealed chamber means and the magnetic means electromagnetically induce a current within the coil means;
   connection means for electrically connecting said coil to a conductor means.

2. The geophone defined in claim 1 in which the magnetic field means, the sealed chamber means and the coil means are substantially circular in transverse cross section and have substantially parallel axes.

3. The geophone of claim 1 wherein said coil means comprises a plurality of coils positioned substantially perpendicularly to said polarized magnetic field.

4. The geophone defined in claim 2 in which the magnetic field means is approximately ½ the diameter of the sealed chamber means.

5. The geophone defined in claim 2 in which the coil means is a hollow, circular coil with a mean diameter substantially equal to the diameter of the magnetic field means.

6. The geophone defined in claim 2 in which the coil means further comprises two identical hollow, circular coils with mean diameters substantially equal to the diameter of the magnetic field means.

7. The geophone defined in claim 1 in which the magnetic field means is a permanent magnet.

8. The geophone defined in claim 2 in which the magnetic field is a permanent magnet which is axially bisected into oppositely polarized halves to form a composite magnetic structure and further comprising:
   means to orient the composite magnetic structure about said polar.

9. The geophone defined in claim 8 wherein the means to orient comprises a weight affixed eccentrically upon said composite magnet.

10. The geophone defined in claim 9 wherein the center of gravity of said weight is located at the midpoint of one of the polarized halves of said composite magnet thereby causing the geophone to exhibit sensitivity in a vertical direction.

11. The geophone defined in claim 9 wherein the center of gravity of said weight is located at the boundary between the two polarized halves of said composite magnet thereby causing the geophone to exhibit sensitivity in a horizontal direction.

12. The geophone defined in claim 9 wherein the center of gravity of said weight is located 45 degrees away from the midpoint of one of the polarized halves of said composite magnet thereby causing the geophone to exhibit directional sensitivity along an axis which is halfway between horizontal and vertical.

13. A self-orienting, directionally sensitive geophone comprising, in combination:
   a sealed chamber having circular, parallel interior end surfaces disposed in planes which are perpendicular to the axis of said chamber;
   a circular, axially magnetized permanent magnet located within said chamber which magnet has a diameter approximately ½ that of the interior diameter of said chamber and which magnet is of a length sufficient to allow its pole faces to lie parallel to and narrowly spaced apart from the chamber interior end surfaces;
   a quantity of ferromagnetic fluid sufficient to fill the remaining interior volume of said sealed chamber which is not otherwise occupied by said magnet;
   at least one circular coil having a mean diameter substantially equal to the diameter of said magnet, which coil is located externally to said chamber interior and disposed coaxially with, and in a plane parallel to, the chamber end interior surfaces; and
   connection means for electrically connecting said coil to a conductor.

14. A self-orienting directionally sensitive geophone comprising, in combination:

a sealed chamber having circular parallel interior end surfaces disposed in planes which are perpendicular to the axis of said chamber;

a circular, axially magnetized permanent magnet located within said chamber, said magnet having a diameter and length which permits it to closely fit within the chamber on all sides, leaving only a relatively narrow gap between each interior chamber surface and the adjacent respective magnet surface, said magnet being axially bisected into opposite polarized halves to form a composite structure;

a biasing means to provide said composite magnet with an eccentric weight distribution with respect to its axis of magnetization whereby the location of the center of gravity of said biasing means serves to determine the axis of sensitivity of the geophone;

a quantity of ferromagnetic fluid sufficient to fill the remaining interior volume of said chamber which is not otherwise occupied by said eccentrically weighted magnet;

at least one circular coil having a mean diameter approximately equal to the diameter of said composite magnet, which coil is located externally to said chamber interior and disposed coaxially with, and in a plane parallel to, the chamber end interior surfaces; and connection means for electrically connecting said coil to a conductor.

* * * * *